United States Patent
Lee et al.

(10) Patent No.: US 10,523,995 B2
(45) Date of Patent: *Dec. 31, 2019

(54) BROADCAST RECEIVER, MOBILE DEVICE, SERVICE PROVIDING METHOD, AND BROADCAST RECEIVER CONTROLLING METHOD

(71) Applicant: SAMSUNG ELECTRONICS CO., LTD., Suwon-si, Gyeonggi-do (KR)

(72) Inventors: Sang-kwon Lee, Suwon-si (KR); Hyok-sung Choi, Seoul (KR); Sung-joo Kim, Suwon-si (KR); Ho-joong Kim, Seongnam-si (KR); Lyun-sik Hyun, Seoul (KR); Se-jun Han, Daejeon (KR); Hee-seok Yu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/509,243

(22) Filed: Jul. 11, 2019

(65) Prior Publication Data
US 2019/0335227 A1 Oct. 31, 2019

Related U.S. Application Data

(63) Continuation of application No. 15/910,355, filed on Mar. 2, 2018, now Pat. No. 10,382,811, which is a (Continued)

(30) Foreign Application Priority Data

Aug. 18, 2009 (KR) .................. 10-2009-0076291

(51) Int. Cl.
*H04N 21/431* (2011.01)
*H04N 21/41* (2011.01)
*H04N 7/16* (2011.01)

(52) U.S. Cl.
CPC ......... *H04N 21/4314* (2013.01); *H04N 7/163* (2013.01); *H04N 21/4126* (2013.01); *H04N 21/4312* (2013.01)

(58) Field of Classification Search
None
See application file for complete search history.

(56) References Cited

U.S. PATENT DOCUMENTS 5,410,326 A 4/1995 Goldstein
7,109,974 B2 9/2006 Kempisty
(Continued)

FOREIGN PATENT DOCUMENTS

JP 2001-222506 8/2001
JP 2002-78042 3/2002
(Continued)

OTHER PUBLICATIONS

Korean Office Action dated Jun. 5, 2015 in corresponding Korean Patent Application 10-2009-0076291.
(Continued)

*Primary Examiner* — John F Mortell
(74) *Attorney, Agent, or Firm* — Staas & Halsey LLP

(57) ABSTRACT

A broadcast receiver includes a mode determination unit to determine a current operation mode among a plurality of operation modes, a communication interface to transmit the determined current operation mode to a mobile device through interactive communication, and to receive a control command from the mobile device, and a controller to provide a service of the determined current operation mode according to the control command received from the mobile (Continued)

device. Accordingly, a user controls the broadcast receiver through the mobile device according to the operation mode so that user's convenience is improved.

19 Claims, 10 Drawing Sheets

Related U.S. Application Data continuation of application No. 14/952,141, filed on Nov. 25, 2015, now Pat. No. 9,912,981, which is a continuation of application No. 12/654,628, filed on Dec. 28, 2009, now Pat. No. 9,232,193.

(56) References Cited

U.S. PATENT DOCUMENTS

| | | | |
|---|---|---|---|
| 7,126,468 | B2 | 10/2006 | Arling et al. |
| 7,174,518 | B2 | 2/2007 | Kim |
| 7,840,990 | B2 | 11/2010 | Shintani et al. |
| 7,916,040 | B2 | 3/2011 | Andersen et al. |
| 7,958,143 | B1 | 6/2011 | Amacker |
| 2003/0071855 | A1 | 4/2003 | Kim |
| 2004/0148632 | A1 | 7/2004 | Park et al. |
| 2004/0183756 | A1 | 9/2004 | Freitas et al. |
| 2007/0229465 | A1 | 10/2007 | Sakai et al. |
| 2007/0294636 | A1 | 12/2007 | Sullivan |
| 2009/0172767 | A1 | 7/2009 | Li et al. |
| 2012/0200489 | A1* | 8/2012 | Miyashita ............. G06F 3/0233 345/156 |

FOREIGN PATENT DOCUMENTS

| | | |
|---|---|---|
| JP | 2003-324779 | 11/2003 |
| KR | 10-2003-0075957 | 9/2003 |
| KR | 10-2007-0057502 | 6/2007 |
| KR | 10-1680125 | 11/2016 |

OTHER PUBLICATIONS

Japanese Office Action dated Jul. 15, 2014 in corresponding Japanese Patent Application 2010-127220.

U.S. Notice of Allowance dated Oct. 2, 2015 in related U.S. Appl. No. 12/654,628.
U.S. Office Action and Interview Summary dated May 13, 2015 in related U.S. Appl. No. 12/654,628.
U.S. Interview Summary dated Oct. 22, 2014 in related U.S. Appl. No. 12/654,628.
U.S. Interview Summary dated Jun. 10, 2014 in related U.S. Appl. No. 12/654,628.
U.S. Office Action dated Apr. 24, 2014 in related U.S. Appl. No. 12/654,628.
U.S. Interview Summary dated Apr. 3, 2014 in related U.S. Appl. No. 12/654,628.
U.S. Office Action dated Dec. 30, 2013 in related U.S. Appl. No. 12/654,628.
U.S. Interview Summary dated Sep. 18, 2013 in related U.S. Appl. No. 12/654,628.
U.S. Office Action dated Jun. 21, 2013 in related U.S. Appl. No. 12/654,628.
U.S. Office Action dated Feb. 25, 2013 in related U.S. Appl. No. 12/654,628.
U.S. Office Action dated Jul. 10, 2012 in related U.S. Appl. No. 12/654,628.
Japanese Office Action dated Nov. 7, 2017 in corresponding Japanese Patent Application No. 2016-171090.
Korean Office Action dated Aug. 30, 2017 in corresponding Korean Patent Application No. 10-2016-0155560.
Republic of Korea Office Action dated Feb. 21, 2017 in corresponding Korean Application No. 10-2016-0155560.
U.S. Office Action dated Jan. 17, 2017 in corresponding U.S. Appl. No. 14/952,141.
U.S. Notice of Allowance dated Jul. 6, 2017 in corresponding U.S. Appl. No. 14/952,141.
U.S. Notice of Allowance dated Nov. 1, 2017 in corresponding U.S. Appl. No. 14/952,141.
Corrected U.S. Notice of Allowance dated Nov. 30, 2017 in corresponding U.S. Appl. No. 14/952,141.
Corrected U.S. Notice of Allowance dated Jan. 4, 2018 in corresponding U.S. Appl. No. 14/952,141.
U.S. Notice of Allowance dated Mar. 27, 2019 in corresponding U.S. Appl. No. 15/910,355.
U.S. Appl. No. 15/910,355, filed Mar. 2, 2018, Sang-kwon Lee.
U.S. Appl. No. 14/952,141, filed Nov. 25, 2015, Sang-kwon Lee.
U.S. Appl. No. 12/654,628, filed Dec. 28, 2009, Sang-kwon Lee.

* cited by examiner

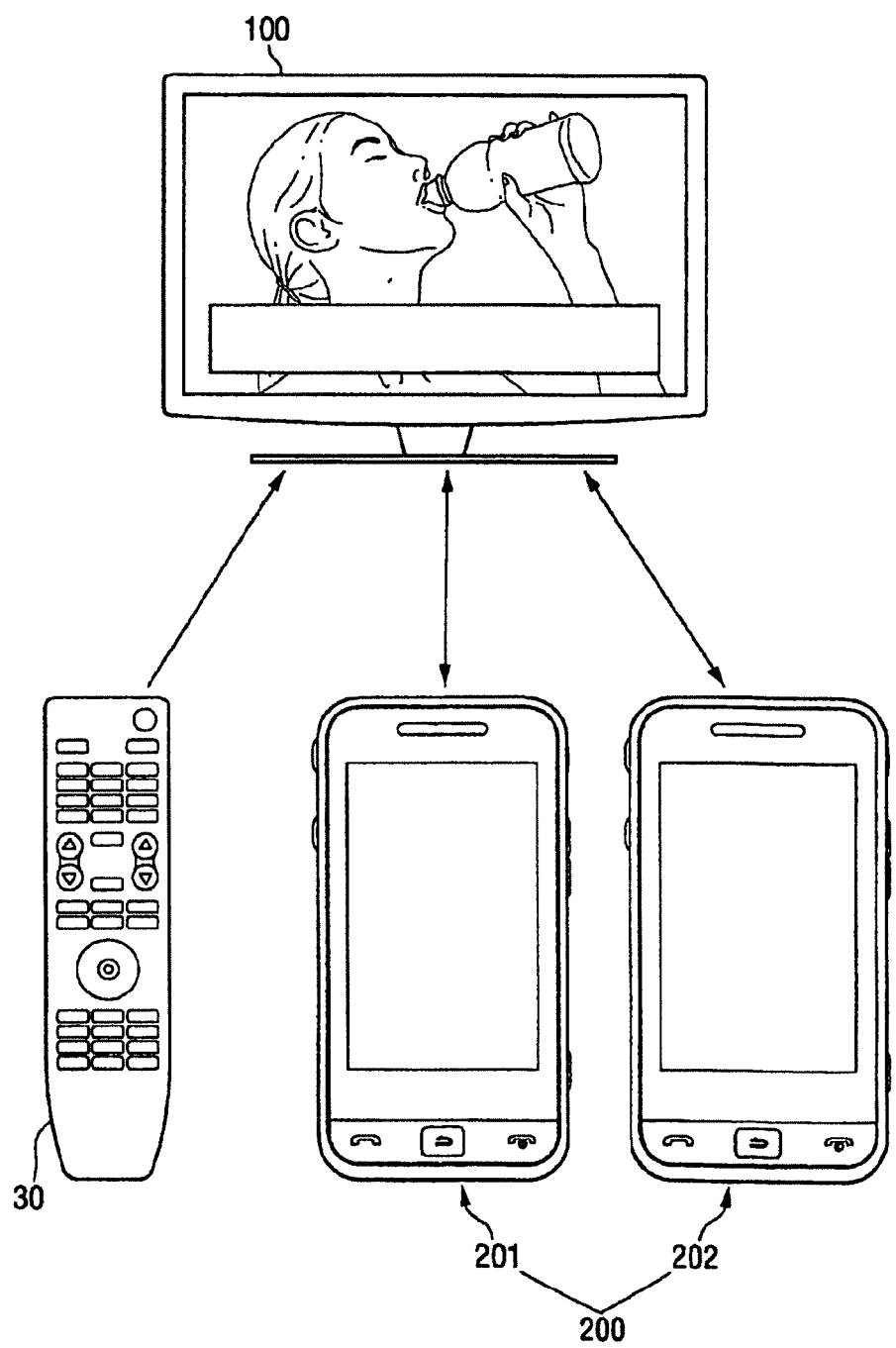

BROADCAST RECEIVER, MOBILE DEVICE, SERVICE PROVIDING METHOD, AND BROADCAST RECEIVER CONTROLLING METHOD

CROSS-REFERENCE TO RELATED APPLICATIONS

This application is a continuation of U.S. patent application Ser. No. 15/910,355, filed Mar. 2, 2018, which is a continuation of U.S. patent application Ser. No. 14/952,141 filed Nov. 25, 2015, now issued as U.S. Pat. No. 9,912,981, which is a continuation of U.S. patent application Ser. No. 12/654,628 filed Dec. 28, 2009, now issued as U.S. Pat. No. 9,232,193, which claims the priority benefit of Korean Patent Application No. 10-2009-0076291, filed on Aug. 18, 2009, in the Korean Intellectual Property Office, the entire disclosures of which are incorporated by reference.

BACKGROUND

1. Field

Embodiments relate to a broadcast receiver, a mobile device, a service providing method and a broadcast receiver controlling method, and more particularly, to a broadcast receiver which provides an operation mode and a mobile device which receives the operation mode from the broadcast receiver and controls the broadcast receiver based on the operation mode, and a service providing method and a broadcast receiver controlling method.

2. Description of the Related Art

Recently, as the development of data transmitting technology is accelerated, interactive data transmission using a video medium becomes possible. Also, as a recent broadcast receiver further includes an internet function, a user can enjoy more diverse services.

Accordingly, the user often encounters situations where he/she should input a text through the broadcast receiver. However, a general remote controller is not easy to use for inputting text. More specifically, in order to input a text using the remote controller, the user should press a button on the remote controller corresponding to a text and check whether a desirable text is input or not through a video medium at a far distanced place (remote location). Therefore, there is a problem that the user should input and check the text from different visual lines.

Also, the broadcast receiver recently provides diverse services in addition to a broadcast receiving service, but in point of fact that a related-art remote controller has uniform input keys, there is a need for an optimal input method of each service to improve user's convenience.

SUMMARY

Aspects of exemplary embodiments provide a broadcast receiver which provides an operation mode and a mobile device which receives the operation mode from the broadcast receiver and controls the broadcast receiver based on the operation mode, and a service providing method and a broadcast receiver controlling method thereof.

According to an aspect of an exemplary embodiment, there is provided a broadcast receiver which supports a plurality of operation modes, including: a mode determination unit to determine a current operation mode among the plurality of operation modes, a communication interface to transmit the determined current operation mode to a mobile device through interactive communication, and to receive a control command from the mobile device, and a controller to provide a service of the determined current operation mode according to the control command received from the mobile device.

The operation modes may be at least one of a television (TV) view mode, a movie mode, a game mode, an internet mode, and a text input mode.

If the control command from the mobile device is to move to a predetermined area on a UI window providing the service, the mode determination unit may determine that the operation mode has been changed.

The controller may assign an identification code to the mobile device, and the communication interface may encrypt the determined current operation mode and the control command from the mobile device with the identification code and may transmit and receive the operation mode and the control command.

The broadcast receiver may further include: a display unit to display service screens of the operation mode, and a storage unit to store a plurality of UI windows corresponding to the operation modes, and the controller may control the communication interface to transmit a UI window corresponding to the current operation mode determined by the mode determination unit to the mobile device.

The controller may control the communication interface to transmit different UI windows to a plurality of mobile devices.

The broadcast receiver may further include a display unit to display service screens of the operation mode, and, if the current operation mode is the text input mode, the controller may control the display unit to receive and display characters input through the mobile device on a real time basis or collectively.

According to another aspect of exemplary embodiments, there is provided a mobile device which controls a broadcast receiver supporting a plurality of operation modes, the mobile device including: a communication interface to receive information regarding a current operation mode among the plurality of operation modes through interactive communication, a user interface to display a UI window corresponding to the received information regarding the current operation mode and to receive a control command regarding the broadcast receiver, and a controller to control the communication interface to transmit the input control command to the broadcast receiver.

The operation modes may be at least one of a TV view mode, a movie mode, a game mode, an internet mode, and a text input mode.

The communication interface may receive an identification code from the broadcast receiver, and may encrypt the information regarding the current operation mode and the control command with the identification code and may receive and transmit the information regarding the current operation mode and the control command.

The communication interface may receive a UI window corresponding to the current operation mode, and the controller may display the received UI window on the user interface.

The communication interface may receive information regarding a service of the current operation mode of the broadcast receiver, and may display the information regarding the service along with the UI window corresponding to the current operation mode.

If the current operation mode is the text input mode, the controller may control the communication interface to transmit characters input through the user interface on a real time basis or collectively.

According to still another aspect of exemplary embodiments, there is provided a service providing method of a broadcast receiver which supports a plurality of operation modes, the method including: determining a current operation mode among the operation modes, transmitting the determined current operation mode to a mobile device through interactive communication, receiving a control command from the mobile device, and providing a service of the determined current operation mode according to the control command received from the mobile device.

The operation modes may be at least one of a TV view mode, a movie mode, a game mode, an internet mode, and a text input mode.

The determining the current operation mode may include determining that the current operation mode has been changed if the control command from the mobile device is to move to a predetermined area on a UI window providing the service.

The transmitting may include transmitting an identification code assigned to the mobile device, and encrypting the determined current operation mode and the received control command with the identification code.

The transmitting may include transmitting a pre-stored UI window corresponding to the determined current operation mode to the mobile device.

The transmitting may include transmitting pre-stored different UI windows to a plurality of mobile devices.

According to still another aspect of exemplary embodiments, there is provided a method for controlling a broadcast receiver which supports a plurality of operation modes, by a mobile device, the method including: receiving information regarding a current operation mode among the plurality of operation modes through interactive communication; displaying a UI window corresponding to the received information regarding the current operation mode; receiving a control command regarding the broadcast receiver; and transmitting the control command to the broadcast receiver.

The operation modes may be at least one of a TV view mode, a movie mode, a game mode, an internet mode, and a text input mode.

The receiving the information regarding the current operation mode may include receiving an identification code from the broadcast receiver, and encrypting the information regarding the current operation mode and the control command with the identification code.

The receiving the information regarding the current operation mode may include receiving a UI window corresponding to the current operation mode, and the displaying may include displaying the received UI window on a user interface.

The receiving the information regarding the current operation mode may include receiving information regarding a service of the current operation mode of the broadcast receiver, and the displaying may include displaying the information regarding the service along with the UI window corresponding to the current operation mode.

According to still another aspect of exemplary embodiments, there is provided at least one computer readable medium storing instructions that control at least one processor to implement the methods of exemplary embodiments.

BRIEF DESCRIPTION OF THE DRAWINGS

These and/or other aspects will become apparent and more readily appreciated from the following description of exemplary embodiments, taken in conjunction with the accompanying drawings of which:

FIG. 2 is a view illustrating an example of connection of the home network system 1000 according to an exemplary embodiment;

DETAILED DESCRIPTION

Figure 1:
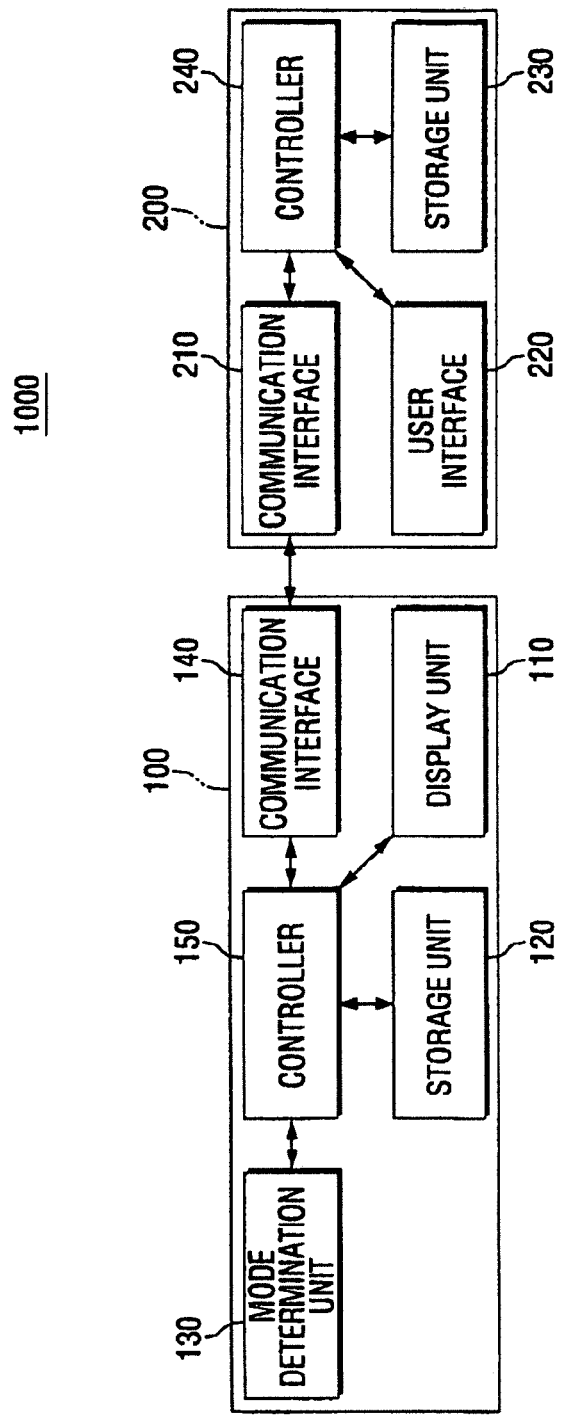
FIG. 1 is a block diagram illustrating a home network system according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a block diagram illustrating a home network system according to an exemplary embodiment.

Referring to FIG. 1, a home network system 1000 includes a broadcast receiver 100 and a mobile device 200. The broadcast receiver 100 supports a plurality of operation modes and provides a user with a video or video/audio information. The broadcast receiver 100 may be realized as a digital TV, a set-top box (STB), a personal computer (PC), a laptop computer, and a portable multimedia player (PMP). The operation mode recited herein is an example of a service supported by the broadcast receiver 100, such as a TV view mode, a movie mode, a game mode, an internet mode, and a text input mode. More specifically, the broadcast receiver 100 includes a display unit 110, a storage unit 120, a mode determination unit 130, a communication interface 140, and a controller 150.

The display unit 110 displays information provided by the broadcast receiver 100. The display unit 110 may be realized as a device such as a touch pad which realizes input/output simultaneously, and may be a video display apparatus such as a liquid crystal display (LCD), a plasma display panel (PDP), and a cathode ray tube (CRT). Accordingly, a user is provided with a service screen from the broadcast receiver 100. If the broadcast receiver 100 is a digital TV, the display unit 110 may be an inner part of the broadcast receiver 100, and, if the broadcast receiver 110 is a set-top box, the display unit 110 may be an external part of the broadcast receiver 100, for example, a monitor or a TV connected to the set-top box.

The storage unit 120 may store contents corresponding to diverse services supported by the broadcast receiver 100 and also may store a plurality of user interface (UI) windows corresponding to the operation modes which will be described later. The storage unit 120 may be realized as an inner storage medium or an external storage medium of the broadcast receiver 100, such as a removable disk including a universal serial bus (USB) memory, a storage medium connected to a separate host, and a web server over a network.

The mode determination unit 130 determines a current operation mode among the plurality of operation modes. As the broadcast receiver 100 supports the plurality of operation modes including the TV view mode, the movie mode, the game mode, the internet mode, and the text input mode, the mode determination unit 130 determines a current operation mode among the plurality of operation modes, by grasping a current service provided by the broadcast receiver 100. The operation of the mode determination unit 130 is performed on a real time basis or is performed according to user's control operation.

Also, if a control command from the mobile device 200 is to move to a predetermined area on a UI window providing a service, the mode determination unit 130 determines that the operation mode has changed. For example, in the broadcast receiver 100 operating in the internet mode, if a user moves a pointed area (indicated by a mouse or a pointer) to an area requiring input of characters (a log-in area or a search term input area) to perform searching or log-in, the mode determination unit 30 determines that the current operation mode has been changed to the text input mode. Also, if operation in the text input mode is completed or if the user moves the pointed area out of the area requiring input of characters, the mode determination unit 130 determines that the current operation mode has been changed from the text input mode to the internet mode.

The communication interface 140 transmits the determined current operation mode to the mobile device 200, and receives a control command from the mobile device 200 through interactive communication. More specifically, the communication interface 140 is connected to the mobile device 200 through interactive communication, and transmits the current operation mode determined by the mode determination unit 130. Also, the communication interface 140 receives a user control command from the mobile device 200. At this time, the communication interface 140 may transmit an acknowledgement signal (ACK) to the mobile device 200 in response to the user control command. The interactive communication recited herein includes all existing communication technologies and all future interactive communication technologies, such as a Bluetooth (BT), radio frequency (RF), wireless fidelity (WI-FI), high definition multimedia interface-consumer electronics control (HDMI-CEC), and wireless HDMI-CES. The communication interface 140 may communicate with the mobile device 200 according to the Universal Plug and Play (UPnP) standard.

The controller 150 provides a service of the determined current operation mode according to the control command received from the mobile device 200. More specifically, the controller 150 converts service operation or a service state in response to the user control command received from the communication interface 140. For example, if the broadcast receiver 100 receives a control command "TV channel up" from the mobile device 200 in the TV view mode, the controller 150 changes the channel of a TV service and provides the TV service. Also, if the broadcast receiver 100 receives a control command "Volume Down" in the movie mode, the controller 150 turns down the volume of a providing movie service and provides the movie service.

Also, the controller 150 may receive and display characters input from the mobile device 200 on a real time basis or collectively. More specifically, if the broadcast receiver 100 is in the text input mode, the broadcast receiver 100 may receive the characters input by the user from the mobile device 200 on a real time basis or collectively. The controller 150 may control the display unit 110 to display the received characters. The transmitted characters may be a direct character code or a number code which corresponds to a character pressed by the user on the mobile device 200 in order to input a character (for example, number 22 corresponding to Alphabet 'b' on a mobile phone).

Also, the controller 150 may assign an identification code to the mobile device 200. A plurality of mobile devices 200 may access the broadcast receiver 100 and the broadcast receiver 100 assigns identification codes to the plurality of mobile devices 200 to discriminate them. In this case, the controller 150 may control the communication interface 140 to encrypt information transmitted between the broadcast receiver 100 and the mobile device 200 using an assigned identification code for security reasons, and to transmit the encrypted information. In practice, a user password may be added to the identification code of the mobile device 200 and encrypted.

Also, the controller 150 may transmit a UI window corresponding to the current operation mode determined by the mode determination unit 130 to the mobile device 200. More specifically, the controller 150 controls the communication interface 140 to extract a UI window corresponding to the current operation mode determined by the mode determination unit 130 from the storage unit 120, and to transmit the UI window to the mobile device 200. For example, if the mobile device 200 has no UI window corresponding to the current operation mode or if the broadcast receiver 100 is currently providing a game service requiring a different UI window for each user (for example, a poker game), the controller 150 may transmit a UI window corresponding to each operation mode to the mobile device 200. In this case, the controller 150 may control the communication interface 140 to transmit different UI windows to the plurality of mobile devices 200. The transmitted UI window may be a UI window which is pre-stored in the storage unit 120 or a new UI window which is created by combining images pre-stored in the storage unit 120.

Also, the controller 150 may transmit information regarding a service of a current operation mode to the mobile device 200. More specifically, the controller 150 may transmit information which is helpful to the user in the process of controlling operation of the broadcast receiver 100, for example, current channel information, a current volume level, a running time, a remaining time, a current time, and electronic program guide (EPG), to the mobile device 200. The information regarding the service may be transmitted at the same time when the current operation mode is transmitted to the mobile device 200 or when the ACK signal corresponding to the user control command is transmitted, or at predetermined period.

The mobile device 200 refers to a device which transmits and receives information to and from the broadcast receiver 100 through interactive communication, and may be realized as a mobile phone, an MP3, a PMP, a navigation system, and a digital album. More specifically, the mobile device 200 includes a communication interface 210, a user interface 220, a storage unit 230, and a controller 240.

The communication interface 210 receives information regarding a current operation mode among a plurality of operation modes through interactive communication. More specifically, the communication interface 210 is connected to the broadcast receiver 100 through interactive communication and receives a current operation mode of the broadcast receiver 100 according to a communication standard such as the UPnP communication standard. Also, the communication interface 210 may transmit a user control command, which will be described later, to the broadcast receiver 100. Also, the communication interface 220 may receive an identification code currently assigned to the mobile device 200, a UI window corresponding to the current operation mode of the broadcast receiver 100, and information regarding the service of the current operation mode.

The user interface 220 displays a UI window corresponding to the received current operation mode, and receives a control command regarding the broadcast receiver 100. More specifically, the user interface 220 may have a plurality of function keys to allow a user to set or select diverse functions supported by the broadcast receiver 100, and may display a plurality of UI windows to control the broadcast receiver 100. The user interface 220 may be realized as a device such as a touch pad which realizes input/output simultaneously, or may be realized as a device integrating a key pad and a display apparatus. Accordingly, the user can be provided with a UI window which is based on (corresponds to) the current operation mode of the broadcast receiver 100 from the user interface 220, and easily controls the broadcast receiver 100 using the UI window. The operation mode recited herein is an example of a service supported by the broadcast receiver 100, such as a TV view mode, a movie mode, a game mode, an internet mode, and a text input mode.

The storage unit 230 may store operation mode information of the broadcast receiver received through the communication interface 210 and a UI window corresponding to the operation mode. The storage unit 230 may be realized as an inner storage medium or an external storage medium of the mobile device 200, such as a removable disk including a USB memory and a web server over a network.

The controller 240 may transmit an input control command to the broadcast receiver 100. More specifically, the controller 240 may control the communication interface 210 to transmit a user control command, which is input through the user interface 220, to the broadcast receiver 100 such that the broadcast receiver 100 provides a service corresponding to the user control command. At this time, the controller 240 may control the communication interface 210 to encrypt information regarding the current operation mode and the control command with the identification code and to transmit and receive the encrypted information and control command. A user password may be added to the identification code of the mobile device 100.

Also, the controller 240 may transmit characters input through the user interface 220 on a real time or collectively. More specifically, if the operation mode of the broadcast receiver 100 is the text input mode, the controller 240 may control the communication interface 210 to transmit the characters input by the user through the user interface 220 on a real time basis or collectively. A method for transmitting characters will be described later with reference to FIGS. 4 and 5.

Also, if a UI window corresponding to the current operation mode of the broadcast receiver 100 is received through the communication interface 210, the controller 240 may control the user interface 220 to display the received UI window. For example, if the broadcast receiver 100 is currently providing a game service requiring a different UI window for each user (for example, a poker game), the controller 240 may control the user interface 200 to display the received UI window. Even if a UI window corresponding to the current operation mode is previously stored, the received UI window may be displayed preferentially.

Also, if information regarding the service of the current operation mode is received from the broadcast receiver 100, the controller 240 may control the user interface 220 to display the information regarding the service along with the UI window corresponding to the current operation mode.

More specifically, as the broadcast receiver 100 transmits information which is helpful to the user, for example, current channel information, a current volume level, a running time, a remaining time, a current time, and EPG, as described above, the controller 240 may control the user interface 220 to display the information along with the UI window corresponding to the current operation mode. The information regarding the service may be displayed continuously, at a predetermined period, or according to a user's manipulation.

Accordingly, the user is provided with the UI window which is corresponds to the operation mode of the broadcast receiver 100 from the mobile device, and, accordingly can control the broadcast receiver 100 easily with improved convenience.

FIG. 2 is a view illustrating an example of connection of the home network system 1000 according to an exemplary embodiment.

Referring to FIG. 2, the home network system 1000 includes a broadcast receiver 100, a remote controller 30, and mobile devices 201, 202. The broadcast receiver 100 is connected to the remote controller 30 in a one-way communication manner and the mobile devices 201, 202 are connected to the broadcast receiver 100 in an interactive communication manner. Accordingly, the broadcast receiver 100 receives a user control command through the remote controller 30, which is a one-way communication device, and also receives a control command from the mobile device 201, 202, which is an interactive communication device.

As a plurality of mobile devices 201, 202 is connected to the broadcast receiver 100, the broadcast receiver 100 may provide each of the mobile devices 201, 202 with a separate UI window to provide a service such as a poker game.

FIGS. 3A to 3G are views to explain operation of the broadcast receiver 100 and the mobile device 200.

Figure 3A:
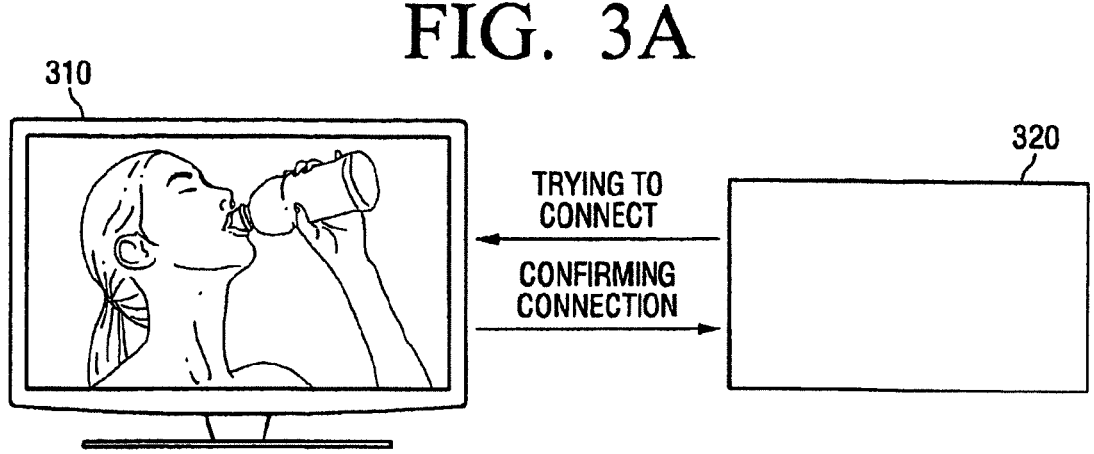
FIGS. 3A to 3G are views to explain operation of a broadcast receiver and a mobile device.

Referring to FIG. 3A, if the mobile device 200 tries to connect to the broadcast receiver 100, the broadcast receiver 100 assigns an identification code to the mobile device 200 and transmits a confirmation that the connection is established. The broadcast receiver 100 is currently providing a current TV service denoted by window 310 and the mobile device 200 displays a UI window denoted by 320.

Figure 3B:
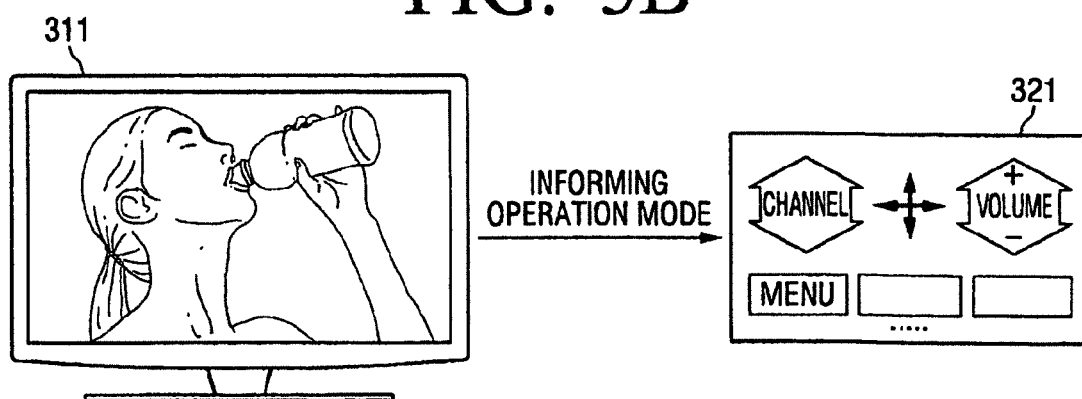

Referring to FIG. 3B, as the broadcast receiver 100 is currently providing a current TV service in window 311 to the mobile device 200, which has been allowed to be connected to the broadcast receiver 100, the broadcast receiver 100 notifies the mobile device 200 of the TV view mode and the mobile device 200 displays a UI window 321 corresponding to the TV view mode. The UI window 321 is an example of a UI window which is used for the TV view mode (which corresponds to the TV view mode). On the other hand, if the broadcast receiver 100 is not providing a current service, for example, if the broadcast receiver 100 is in a turn-off state or if the mobile device 200 cannot receive operation mode information from the broadcast receiver 100, the mobile device 200 may display a UI window 321 corresponding to a default operation mode (for example, a TV reception mode).

Figure 3C:
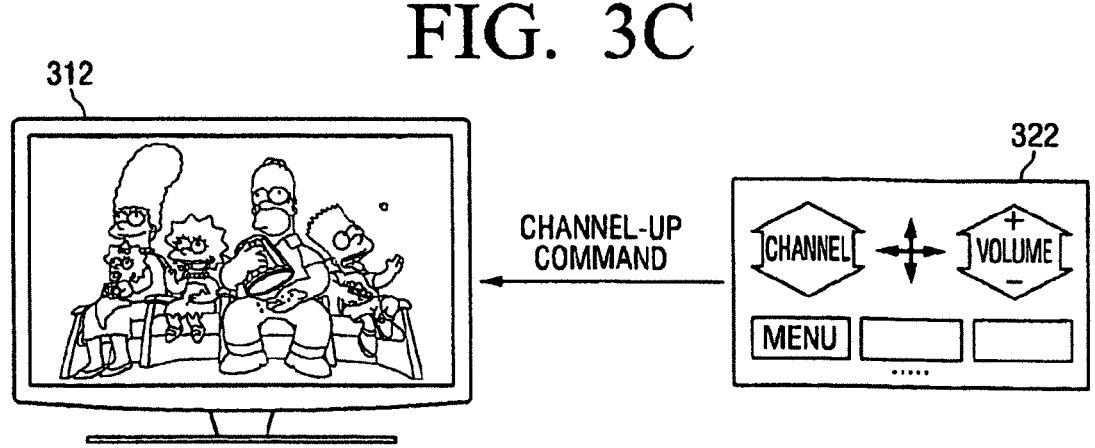

Referring to FIG. 3C, if a user inputs a channel-up command through a displayed UI window 322, the mobile device 200 transmits the channel-up command to the broadcast receiver 100 and the broadcast receiver 100 provides the user with a service denoted by window 312 corresponding to an upper channel in response to the user command.

Figure 3D:
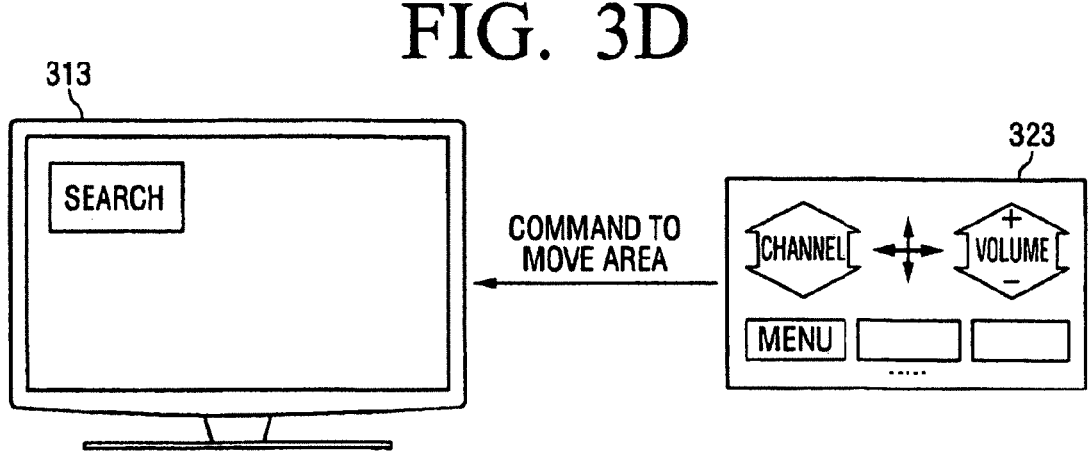
Figure 3E:
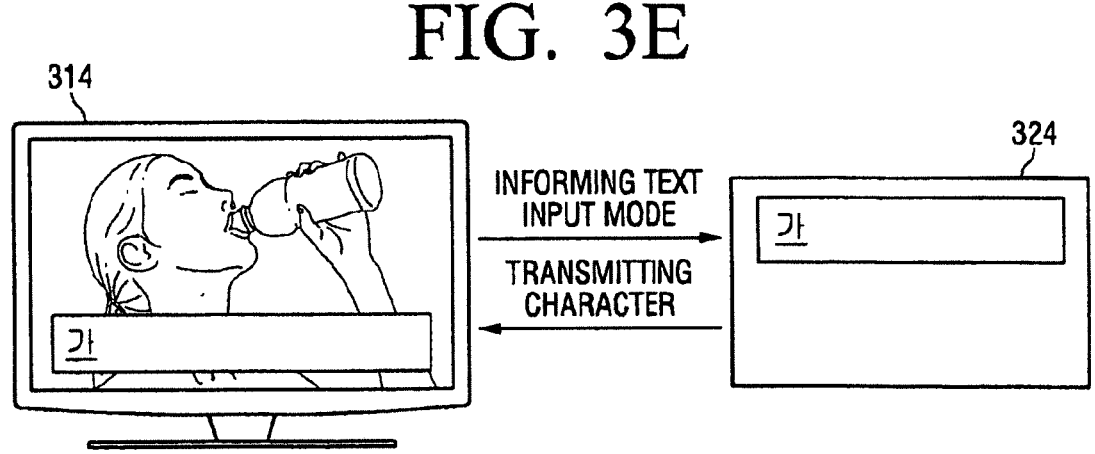

Referring to FIGS. 3D and 3E, if the user inputs a command to move a pointed area (indicated by a mouse or a pointer) of a UI window 313 to an area requiring input of characters (a search area), the broadcast receiver 10 notifies the mobile device 200 that the operation mode of the broadcast receiver 100 has been changed to the text input mode as shown in FIG. 3E, and the mobile device 200 displays a UI window 324 corresponding to the text input mode. The UI window 324 is an example of a UI window which is used for the input of characters, and the UI window denoted by 314 shows the characters and TV service. The UI window 323 shows examples of user input commands.

Figure 3F:
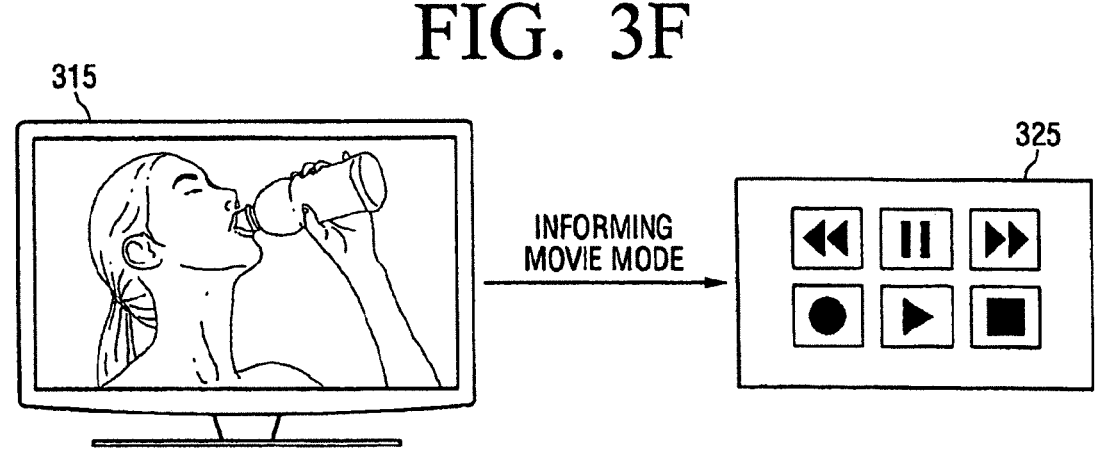
Figure 3G:
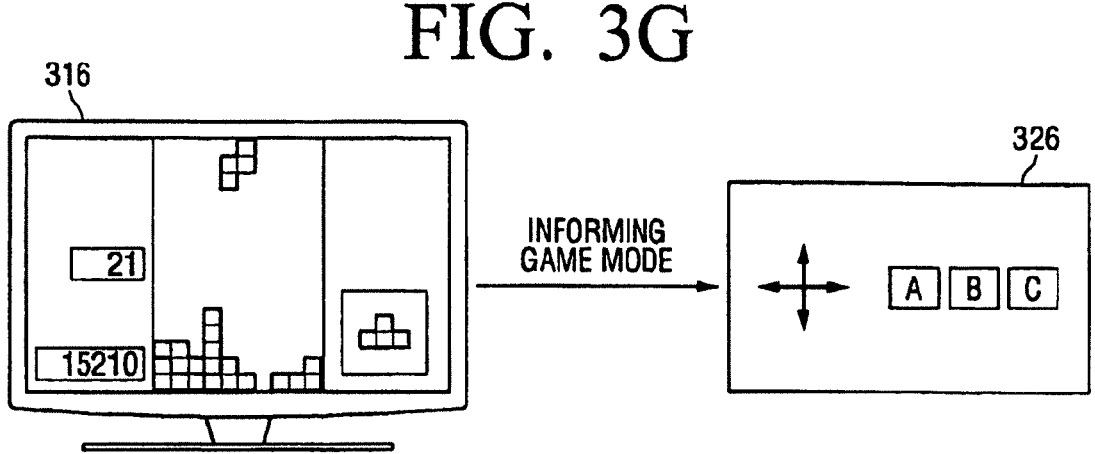

Also, FIGS. 3F and 3G illustrate examples of UI windows which can be displayed on the mobile device 200 if the operation mode of the broadcast receiver 100 is the movie mode and the game mode. A UI window 325 is an example of a UI window which is used for the movie mode (which corresponds to the movie mode), and a UI window 326 is an example of a UI which is used for the game mode (which corresponds to the game mode). The UI window 326 may be used according to the type of game provided by the broadcast receiver 100. The UI window 315 is an example of a UI window which may correspond to movie mode, and the UI window denoted by 316 is an example of a UI window which may correspond to game mode.

Figure 4A:
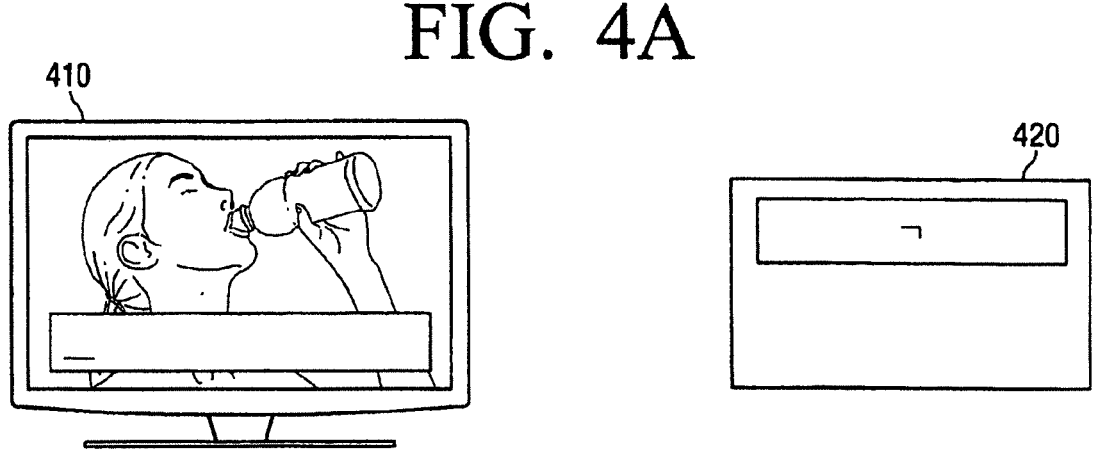
FIGS. 4A-4G and 5A-5D are views illustrating a method for inputting characters according to an exemplary embodiment.
Figure 4B:
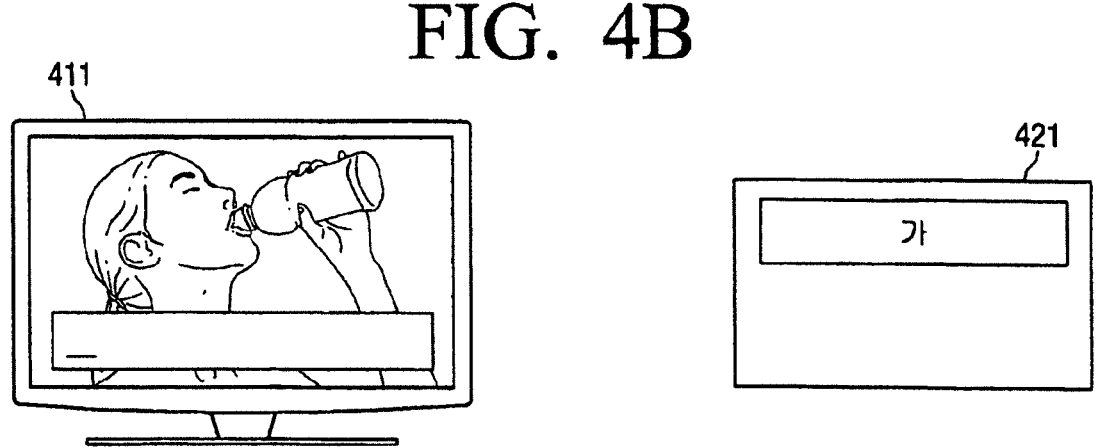
Figure 4C:
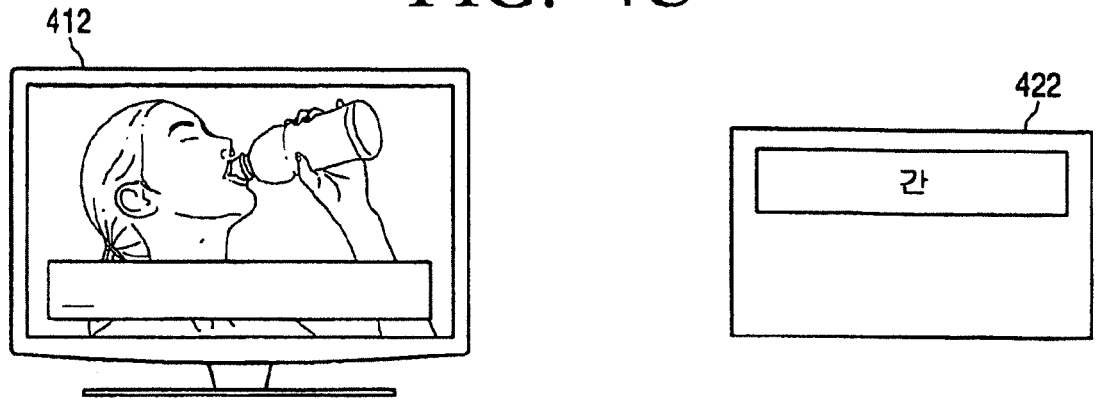
Figure 4D:
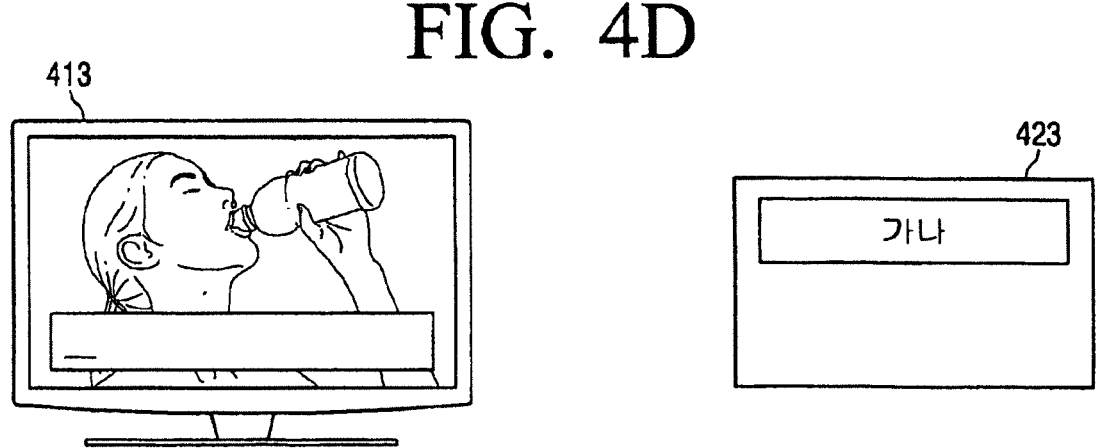
Figure 4E:
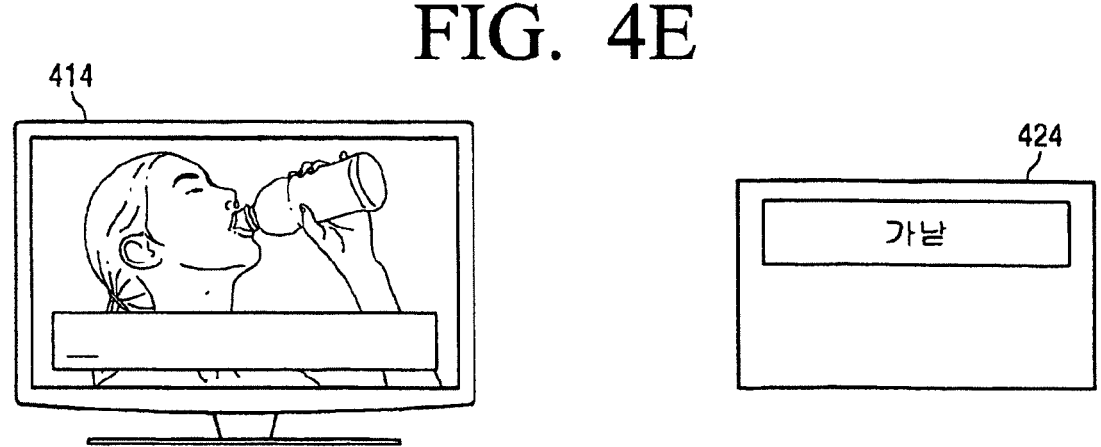
Figure 4F:
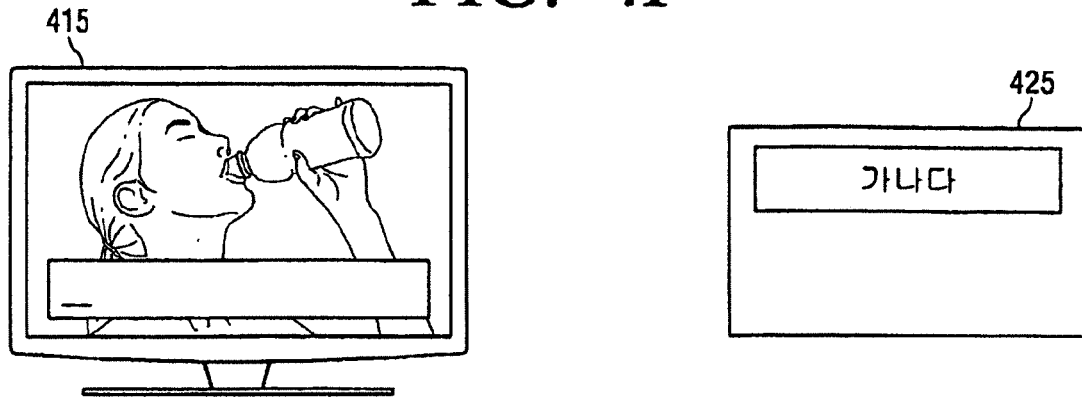
Figure 4G:
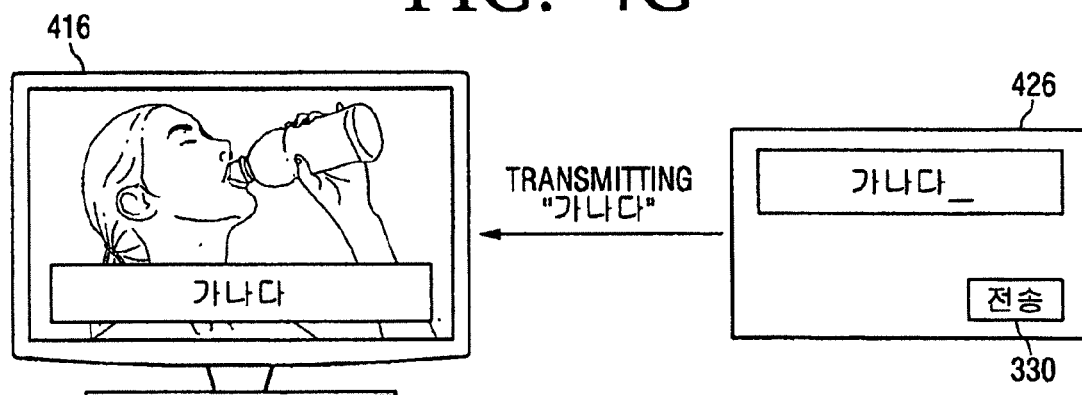
Figure 5A:
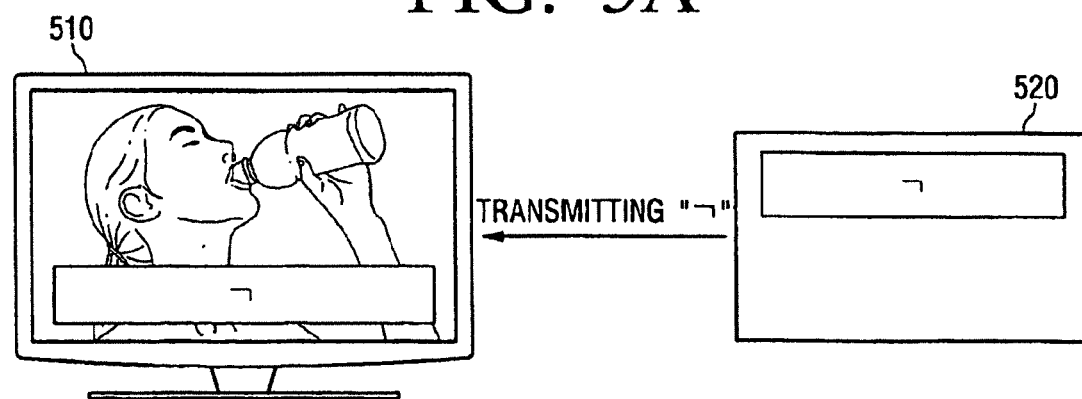
Figure 5B:
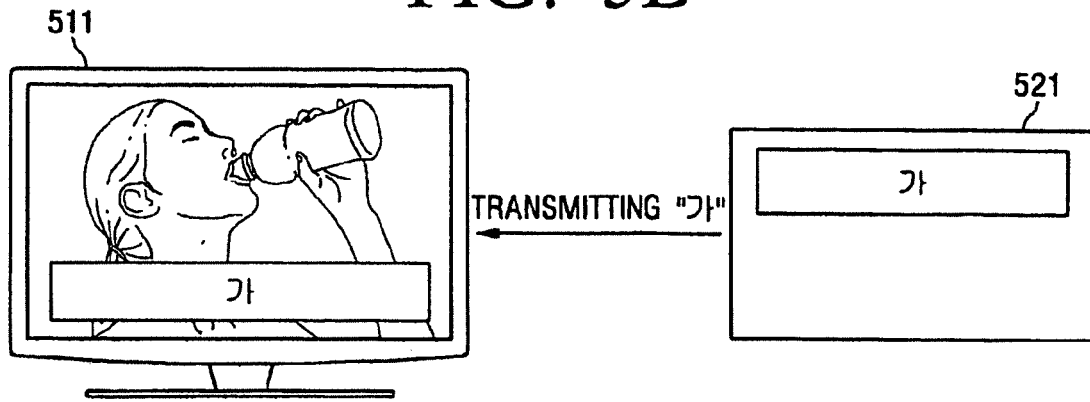
Figure 5C:
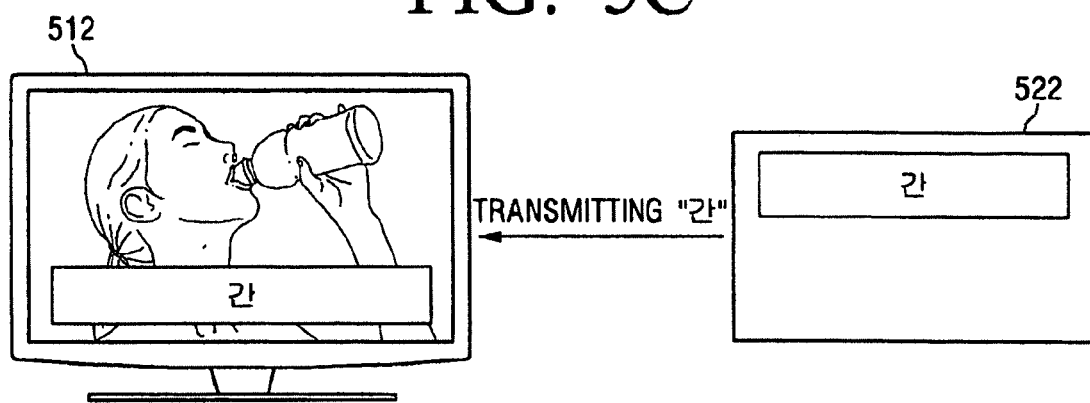
Figure 5D:
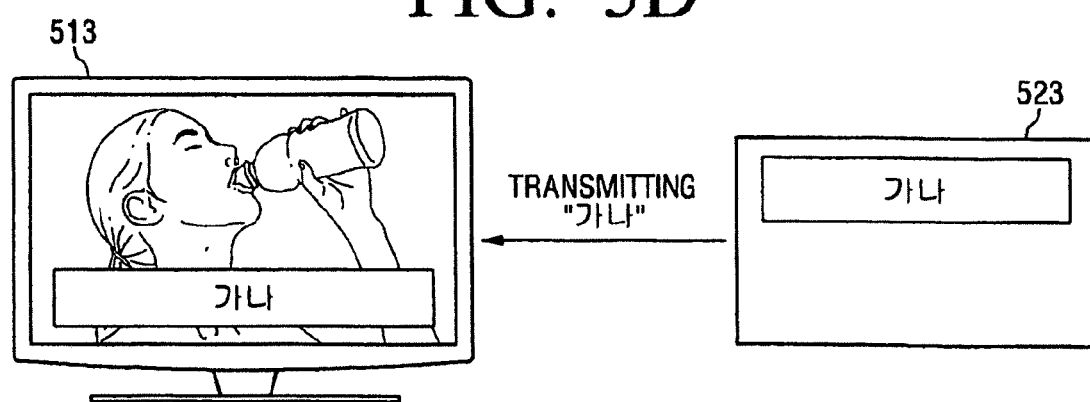

FIGS. 4A and 5D are views illustrating a method for inputting characters of the broadcast receiver 100 according to an exemplary embodiment.

Referring to FIGS. 4A to 4G, if the characters input through the mobile device 200 are collectively transmitted to the broadcast receiver 100, examples of UI windows displayed on the broadcast receiver 100 and the mobile device 200 are illustrated. More specifically, when the user inputs characters, UI windows 420-425 of the mobile device 200 change but UI windows 410-415 do not change. However, if the user presses a send button 430 after completing input of the characters, the Korean characters "가나다" are transmitted to the broadcast receiver 100 and the broadcast receiver 100 collectively receives and display the characters.

Referring to FIGS. 5A to 5D, if the characters input by the mobile device 200 are transmitted to the broadcast receiver 100 on a real time basis, examples of UI windows displayed on the broadcast receiver 100 and the mobile device 200 are illustrated. More specifically, when the user inputs the characters, UI windows 520-523 of the mobile device 200 change and UI windows 510-513 of the broadcast receiver 100 also change.

In FIGS. 5A to 5D, the character displayed on the UI windows 520-523 is transmitted to the broadcast receiver 100. However, the characters may be transmitted in order of being pressed by the user. For example, the character 'ㅏ' is transmitted in FIG. 5B and the character 'ㄴ' is transmitted in FIG. 5C.

Although the characters input by the user are transmitted to the broadcast receiver 100 in FIGS. 4A and 5D, numbers input by the user through the mobile device 200 may be transmitted to the broadcast receiver 100 and the broadcast receiver 100 converts the numbers into characters.

Figure 6:
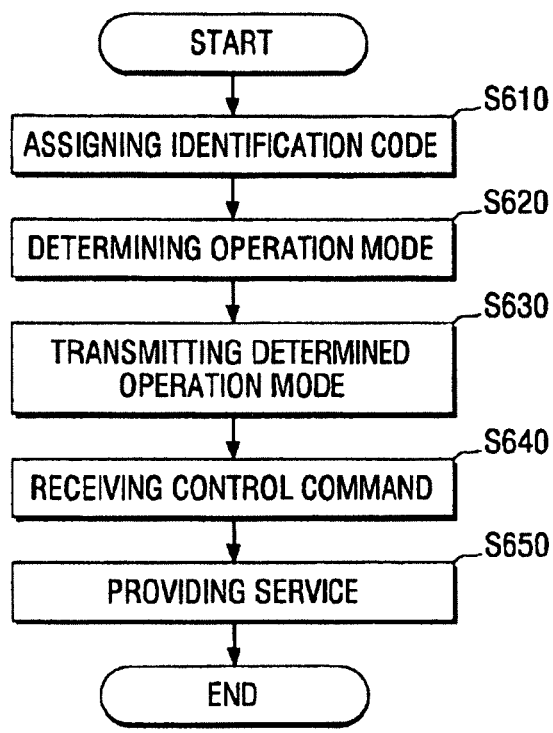
FIG. 6 is a flowchart illustrating a service providing method according to an exemplary embodiment.

FIG. 6 is a flowchart illustrating a service providing method according to an exemplary embodiment.

An identification code is assigned to the mobile device 200 which performs interactive communication with the broadcast receiver 100 (S610). More specifically, a plurality of mobile devices 200 may access the broadcast receiver 100 and the broadcast receiver 100 may assign an identification code to each of the mobile devices 200 to discriminate them. The identification code may be assigned in order of connected mobile devices or using a predetermined algorithm. If only a single mobile device is connected to the broadcast receiver 100, assigning an identification code may be omitted.

A current operation mode is determined (S620). More specifically, as the broadcast receiver 100 supports a plurality of operation modes including a TV view mode, a movie mode, a game mode, an internet mode, and a text input mode, a current operation mode is determined among the plurality of operation modes by grasping a currently providing service. The current operation mode is determined on a real time basis or according to a control operation by the user. If a control command from the mobile device 200 is to move to a predetermined area on the UI window providing a service, it is determined that the operation mode has been changed and an operation mode corresponding to the predetermined area is determined.

Next, the current operation mode determined through interactive communication is transmitted to the mobile device 200 (S630). At this time, the identification code assigned to the mobile device 200, a pre-stored UI window corresponding to the determined current operation mode, and information regarding the current operation mode may be transmitted. If a plurality of mobile devices 200 is connected to the broadcast receiver 100, different UI windows may be transmitted to the mobile device 200. Also, the determined current operation mode may be encrypted using the identification code assigned to the mobile device 200 when being transmitted.

Next, a control command is received from the mobile device 200 (S640) and a service of a selected operation mode is provided according to the control command received from the mobile device (S650).

According to the service providing method according to an exemplary embodiment, since the broadcast receiver 100 is controlled by the mobile device 200 located at a far-distanced place (remote location) to provide a service, user's convenience can be improved. The service providing method of FIG. 6 can be executed by the broadcast receiver 100 having the configuration of FIG. 1 and also can be executed by any other type broadcast receiver.

Figure 7:
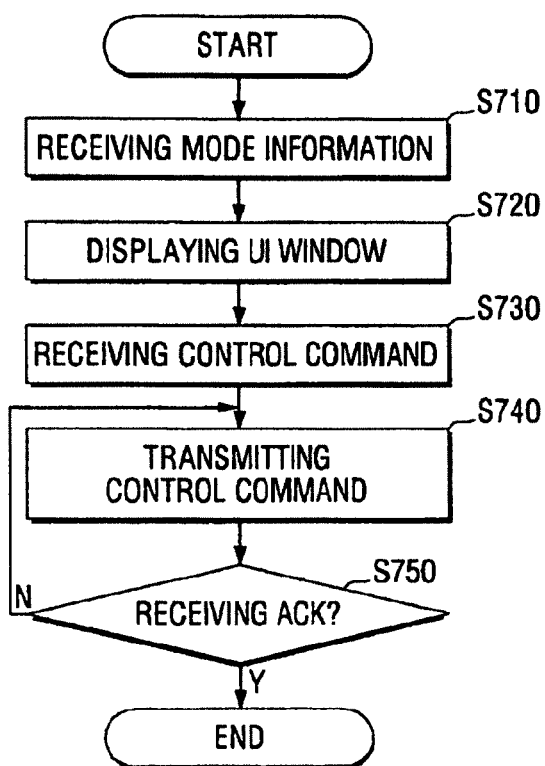
FIG. 7 is a flowchart illustrating a broadcast receiver controlling method according to an exemplary embodiment.

FIG. 7 is a flowchart illustrating a method for controlling a broadcast receiver according to an exemplary embodiment.

Information regarding a current operation mode is received through interactive communication (S710). At this time, an identification code for the current mobile device 200, a UI window corresponding to the current operation mode of the broadcast receiver 100, and information regarding a service of the current operation mode may be received. The operation mode information may be encrypted using the identification code assigned to the mobile device 200. In this case, the mobile device 200 may decrypt the identification code assigned thereto.

A UI window corresponding to the received operation mode is displayed (S720) and a control command regarding the broadcast receiver 100 is input (S730). More specifically, the user is provided with a UI window which corresponds to the operation mode of the broadcast receiver 100 and inputs a control command regarding the broadcast receiver 100 through the UI window. If the UI window corresponding to the operation mode of the broadcast receiver 100 is received at the time of receiving the operation mode, the received UI window may be displayed instead of a pre-stored UI window. Also, if information regarding a service of the current operation mode is received at the time of receiving the operation mode, the information about the service may be displayed along the UI window corresponding to the current operation mode. More specifically, the broadcast receiver 100 may transmit information helpful to the user, such as current channel information, a current volume level, a running time, a remaining time, a current time, and EPG, and the information may be displayed along with the UI window corresponding to the current operation mode.

The input control command is transmitted to the broadcast receiver 100 (S740). More specifically, the input user control command is transmitted to the broadcast receiver 100 such that the broadcast receiver 100 provides a service corresponding to the input user control command. At this time, the control command may be encrypted with an identification code.

Finally, it is determined whether an ACK is received from the broadcast receiver 100 or not in response to the control command (S750). If the ACK is not received for a predetermined time, the control command may be re-transmitted. However, the operation of receiving the ACK may be omitted.

As described above, since the user can control the broadcast receiver 100 through the mobile device 200 according to the operation mode, the user's convenience is improved. The method for controlling the broadcast receiver 100 can be executed by the mobile device 200 having the configuration of FIG. 1 or can be executed by any other type mobile device.

The above-described exemplary embodiments may be recorded in computer-readable media/medium including program instructions to implement various operations embodied by a computer. The media/medium may also include, alone or in combination with the program instructions, data files, data structures, and the like. Examples of computer-readable media/medium include universal serial bus (USB) memory; magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media/medium may also be a distributed network, so that the program instructions are stored and executed in a distributed fashion. The program instructions may be executed by one or more processors. The computer-readable media/medium may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few exemplary embodiments have been shown and described, it would be appreciated by those skilled in the art that changes may be made to these exemplary embodiments without departing from the principles and spirit of the disclosure, the scope of which is defined in the claims and their equivalents.

What is claimed is:

1. An electronic device configured to be controlled by a mobile communication device, the electronic device comprising:
   a communication interface;
   a memory storing instructions; and
   one or more processors that execute the instructions stored in the memory to:
      receive, from the mobile communication device by the communication interface, a first data corresponding to a first user input for selecting at least a portion of a screen provided by the electronic device, the first user input being obtained through a first user interface provided on the mobile communication device,
      based on the received first data corresponding to the first user input, identify a portion of the screen provided by the electronic device,
      based on the identified portion of the screen, control the communication interface to transmit, to the mobile communication device, a second data to cause a second user interface for inputting alphanumeric characters to be provided on the mobile communication device,
      receive, from the mobile communication device by the communication interface, a third data corresponding to a second user input for inputting at least one character, the second user input being obtained through the second user interface provided on the mobile communication device, and
      based on the received third data corresponding to the second user input, provide a character on a screen corresponding to the identified portion of the screen provided by the electronic device.

2. The electronic device of claim 1, wherein the one or more processors are further configured to:
   receive, from the mobile communication device by the communication interface, a fourth data indicating the at least a portion of the screen selected by the first user input no longer being selected,
   based on the received fourth data, control the communication interface to transmit, to the mobile communication device, a fifth data to cause the first user interface to be re-provided on the mobile communication device.

3. The electronic device of claim 1, wherein the identified portion of the screen is a character input area.

4. The electronic device of claim 1, wherein the communication interface of the electronic device is configured to communicate with the mobile communication device via a bidirectional wireless communication link.

5. The electronic device of claim 1, wherein the electronic device is connected to a display device and the electronic device provides the display device with a screen.

6. The electronic device of claim 1, wherein the character includes an alphanumeric character.

7. The electronic device of claim 1, wherein the second user interface provided on the mobile communication device includes a text keypad for receiving the second user input.

8. The electronic device of claim 1, wherein the identified portion of the screen is any one of a log-in area, a search term input area, an address bar, and a character input area.

9. The electronic device of claim 3, wherein the one or more processors are further configured to identify the portion of the screen based on a pointer or a cursor being moved to the character input area.

10. A method of controlling an electronic device connected with a mobile communication device, the method comprising:
    receiving, from the mobile communication device, a first data corresponding to a first user input for selecting at least a portion of a screen provided by the electronic device, the first user input being obtained through a first user interface provided on the mobile communication device,
    identifying, by the electronic device, a portion of the screen provided by the electronic device based on the received first data corresponding to the first user input,
    transmitting, to the mobile communication device, a second data to cause a second user interface for inputting alphanumeric characters to be provided on the mobile communication device based on the identified portion of the screen, receiving, from the mobile communication device, a third data corresponding to a second user input for inputting at least one character, the second user input being obtained through the second user interface provided on the mobile communication device, and providing, by the electronic device, a character on a screen corresponding to the identified portion of the screen provided by the electronic device based on the received the third data corresponding to the second user input.

11. The method of claim 10, further comprising:

receiving, from the mobile communication device, a fourth data indicating the at least a portion of the screen selected by the first user input no longer being selected, transmitting, to the mobile communication device, a fifth data to cause the first user interface to be re-provided on the mobile communication device based on the received fourth data.

12. The method of claim 10, wherein the identified portion of the screen is a character input area.

13. The method of claim 10, wherein the electronic device is configured to communicate with the mobile communication device via a bidirectional wireless communication link.

14. The method of claim 10, wherein character includes an alphanumeric character.

15. The method of claim 10, wherein the second user interface provided on the mobile communication device comprises a text keypad for receiving the second user input.

16. The method of claim 10, wherein the identified portion of the screen is any one of a log-in area, a search term input area, an address bar, and a character input area.

17. The method of claim 12, wherein the identifying the portion of the screen comprises moving a pointer or a cursor to the character input area based on the received first data.

18. A mobile communication device configured to control an electronic device, the mobile communication device comprising:

a communication interface, a memory storing instructions; and one or more processor that executes the instructions stored in the memory to:

display a first user interface for selecting at least a portion of a screen provided by the electronic device, control the communication interface to transmit, to the electronic device, a first data corresponding to a first user input obtained through the first user interface, for selecting a portion of a screen provided by the electronic device, receive, from the electronic device by the communication interface, a second data based on the selected portion of the screen provided by the electronic device, display a second user interface for inputting alphanumeric characters based on the second data being received, and control the communication interface to transmit, to the electronic device, a third data corresponding to a second user input obtained through the second user interface, for inputting at least one character.

19. The mobile communication device of claim 18, wherein the first user input and the second user input are touch based user inputs.

* * * * *

UNITED STATES PATENT AND TRADEMARK OFFICE
CERTIFICATE OF CORRECTION

PATENT NO. : 10,523,995 B2  
APPLICATION NO. : 16/509243  
DATED : December 31, 2019  
INVENTOR(S) : Sang-kwon Lee et al.

Page 1 of 1

It is certified that error appears in the above-identified patent and that said Letters Patent is hereby corrected as shown below:

In the Claims

Column 13, Line 12, In Claim 10, after "received" delete "the".

Column 14, Line 7, In Claim 18, delete "interface," and insert -- interface; --, therefor.

Signed and Sealed this  
Eighteenth Day of February, 2020

Andrei Iancu  
*Director of the United States Patent and Trademark Office*